(12) United States Patent
Dalley

(10) Patent No.: US 6,173,186 B1
(45) Date of Patent: Jan. 9, 2001

(54) CELL RADIUS ESTIMATION METHOD

(75) Inventor: James Edward Dalley, Harlow (GB)

(73) Assignee: Nortel Networks Limited, Montreal (CA)

(*) Notice: Under 35 U.S.C. 154(b), the term of this patent shall be extended for 0 days.

(21) Appl. No.: 09/185,933

(22) Filed: Nov. 4, 1998

(30) Foreign Application Priority Data

Aug. 27, 1998 (GB) .................................................. 9818745

(51) Int. Cl.$^7$ ............................ H04Q 7/20; H04Q 17/00
(52) U.S. Cl. ..................................... 455/446; 455/67.6
(58) Field of Search ................................... 455/446, 422, 455/67.6, 561, 562, 423; 342/458

(56) References Cited

U.S. PATENT DOCUMENTS

| | | | | |
|---|---|---|---|---|
| 5,883,889 | * | 3/1999 | Faruque | 370/335 |
| 5,966,661 | * | 10/1999 | Bernardin et al. | 455/446 |
| 5,983,106 | * | 11/1999 | Bernardin et al. | 455/446 |
| 6,006,095 | * | 12/1999 | Bernardin et al. | 455/446 |
| 6,041,236 | * | 3/2000 | Bernardin et al. | 455/446 |
| 6,052,583 | * | 4/2000 | Bernardin | 455/423 |

OTHER PUBLICATIONS

Hata, Empirical Formula for Propagation Loss in Land Mobile Radio Services, IEEE Transactions on Vehicular Technology, vol. VT–29, No. 3, Aug., 1980, pp. 317–325.*

* cited by examiner

*Primary Examiner*—Reinhard J. Eisenzopf
*Assistant Examiner*—Charles N. Appiah
(74) *Attorney, Agent, or Firm*—Lee, Mann, Smith, McWilliams, Sweeney & Ohlson

(57) ABSTRACT

Current radio telecommunications cell radius estimation methods can result in spurious and inaccurate results outside regions with well sampled signal measurements. The present invention provides an improved cell radius estimation method using path loss and signal source distance data as well as a method for determining models for use in cell estimation without test data. The methods apply a fixed gradient line fit to the data to obtain cell radius estimates and to determine models for one or more geomorphology classifications. Cell radius estimates determined from the test data and the models can be used for cell distribution planning in network coverage planning applications. The invention provides improved accuracy as well as reduced costs in the network planning stage.

14 Claims, 4 Drawing Sheets

CELL RADIUS ESTIMATION METHOD

FIELD OF THE INVENTION

The present invention relates to the estimation of coverage area or cell radius for actual and proposed telecommunications base stations.

PRIOR ART

The estimation of the coverage area (of a predetermined minimum signal level) or cell radius of a telecommunications base station is typically made using road driven test data and either a published or derived model. Path loss and base station antenna distance data are gathered from various road locations and correlated to produce a least squares line fit with corrections for cell topology and building clutter factors. This line fit can then be used to determine a cell radius (for example the 50% reliability edge), corresponding to a predetermined (for example −90 dBm) signal level. This method is of limited value however where road tests provide data which is biased by conditions peculiar to the regions covered by road within the cell—for example increased building clutter and flatter topology than the rest of the cell. This can lead to wide variations in cell radius estimation for cells of the same geomorphology—natural topology and vegetation type as well as the level of man-made object distribution or building clutter.

Such fast and inexpensive cell radius estimation methods are typically employed in the planning and bidding stage of a network installation project. The methods rely on actual signal path loss test data obtained from cells with test base stations temporarily installed, that data being used to estimate the cell radius when an actual base station is installed. This in turn enables the network coverage area to be tested using different base station combinations. Signal strength and location readings are taken and converted to path loss and base station distance. The data is then correlated and extrapolated to estimate the cell radius as described above. The data collected on such tests is often restricted to a small part of the cell due to limited road access or limited resources for example. This small sample can often bias the overall cell radius estimation, for example due to a particularly dominant feature such as a large building or hill around the test data collection site which is not present in the rest of the cell.

The use of such cell radius estimation methods often results in inaccurate estimates which can result in significant commercial losses when the network is installed. If the cell radius has been overestimated, an additional base station may be required to boost signal levels. If the cell radii have been underestimated, additional base stations will have been installed which were not actually required. Excess concentration of base stations also causes interference problems. As the cost of base station installation is very high, it is extremely commercially advantageous to obtain accurate estimates of the number of base stations required at the planning and bidding stage prior to installation of the network.

OBJECT OF THE INVENTION

It is an object of the present invention to provide an improved telecommunications cell radius estimation method.

SUMMARY OF THE INVENTION

In a first aspect the present invention provides a method for estimating the radius of a radio telecommunications cell comprising the steps of:

determine path loss and range data from a plurality of predetermined locations within said cell;

apply a fixed gradient line fit to said data; obtain from said line fit a radius estimate for said cell corresponding to a predetermined signal level.

For the purposes of this specification, the term path loss means transmitter power (for example base station EIRP) less a measured signal level. The path loss may be determined either between a base station antenna and a mobile antenna or a mobile antenna and a base station antenna. The term range means the distance between the base station antenna and a mobile antenna.

The term fixed gradient may include a line fit comprising two or more sections, each of a different fixed gradient.

Preferably the method further comprises the additional step of: removing determined data less thana predetermined range.

Preferably the method further comprises the additional step of: removing determined data having a signal level below a predetermined signal floor level.

Preferably the method further comprises the additional step of: removing determined data with a range over which the average signal level is within a predetermined signal difference level of a predetermined signal floor level. Preferably the predetermined signal difference level corresponds to two standard deviations.

Preferably the method further comprises the additional step of: removing determined data having a path loss less than a theoretical minimum path loss.

Preferably the method further comprises the additional step of: removing determined data having a signal level above a predetermined maximum signal level. Preferably said predetermined maximum signal level is determined by the receiving device determining said data.

Preferably the method further comprises the additional step of: removing determined data having a path loss differing from the average path loss of other determined data at substantially the same range by an amount greater than a predetermined path loss difference.

Preferably the fixed gradient line fit is determined according to the equation:

$$A = (\Sigma P.L.i - B\Sigma Ri)/n$$

where:

A=path loss intercepts value
P.L.=path loss data
R=range data
n=number of data
B=fixed gradient Preferably the fixed gradient is dependent on the height of the base station antenna. Preferably the fixed gradient is determined from a HATA path loss model.

In a second aspect the present invention provides a method for producing a model for use in radio telecommunications cell radius estimation comprising the steps of:

determine path loss and range data from a plurality of predetermined locations within each of a plurality of cells;

classify each cell according to geomorphology;

for each cell apply a fixed gradient line fit to said data and determine a path loss intercept at a predetermined range;

for each classification add said intercept values for each cell together with a corresponding base station height (above terrain or relative to impending clutter) to a database, apply a line fit to said database data to obtain a model of path loss intercept values versus base station antenna height for use in the estimation of cell radii for cells of a selected base station antenna height and geomorphology classification.

In a third aspect the present invention provides a method for estimating the radius of a radio communications cell comprising the steps of: determine the path loss intercept value from a model for a selected base station antenna height and geomorphology; apply a fixed gradient line to the intercept; and obtain from said line fit a radius estimate for said cell corresponding to a predetermined signal level.

In a fourth aspect the present invention provides a method of determining radio telecommunications cell radius estimates for planning a cellular network coverage area comprising the steps of: divide the network coverage area into a plurality of cells; for a predetermined percentage of said cells determine cell radius estimates according to the method of the first aspect of the invention; and for the remaining percentage of cells determine cell radius estimates according to the method of the third aspect of the invention.

BRIEF DESCRIPTION OF THE DRAWINGS

In order that a greater understanding of the invention can be obtained, embodiments of the invention will now be described with reference to the accompanying drawings, by way of example only and without intending to be limiting, in which.

DETAILED DESCRIPTION

Figure 1:
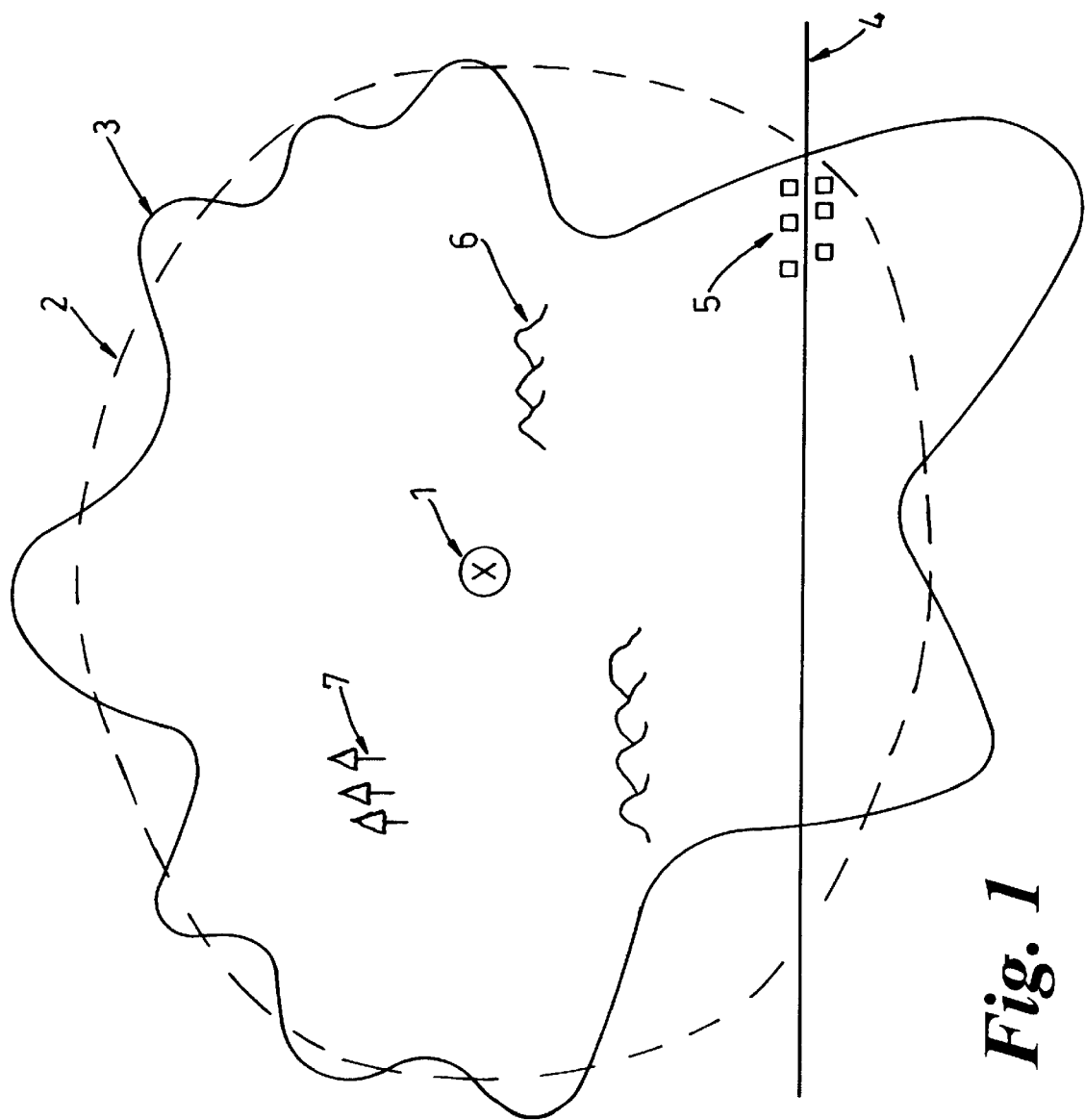
FIG. 1 shows a radio communications cell.

Referring to FIG. 1 a telecommunications cell is shown comprising a base station 1 with an estimated cell radius 2. In practice the actual radius 3 will be of irregular shape due to the influence on path loss of the geomorphological environment, for example the urban, suburban or industrial landscape including features such as buildings 5, hills 6 and forests 7. The actual cell radius 3 is determined by a predetermined signal level from the base station—for example the $-90$ $dBm_m$ level. The distance from the base station to this point then determines the cell radius in a particular direction.

The estimated cell radius 2 represents the 50% reliability cell edge 2 represents a statistical average distance from the base station in which subscriber equipment such as mobile phones or fixed wireless access transceivers will have sufficient signal level to operate around 50% of this perimeter. Once estimated, this cell radius can be used to derive the more useful 75% reliability cell edge which corresponds to approximately 95% cell coverage.

Road tests are used to collect data on path loss. An operator drives along roads 4 taking signal strength and location readings at predetermined intervals which are then converted into path loss (with fast fading averaged out) and range data given the base station transmission signal strength and location.

Preferably information about the geomorphology of each location, such as the level of building clutter, types, heights and densities of buildings, cell topology and vegetation, path clutter is included within the data set. This may be operator entered or derived from known data bases which match geomorphological information with location using digitised mapping data bases.

The road coverage within a cell is typically limited and will not extend around the perimeter of the cell. Often road test data for a cell is only available for a limited range from the base station and can be biased by geomorphological influences such as hills or building clutter which are not typical of the cell. Using prior art estimation methods in which a least squares line fit is applied to the test data, the cell radius estimation method can produce unstable and clearly non-sensible path loss gradients resulting in misleading and incorrect estimations as can be seen in FIG. 2a.

Figure 2A:
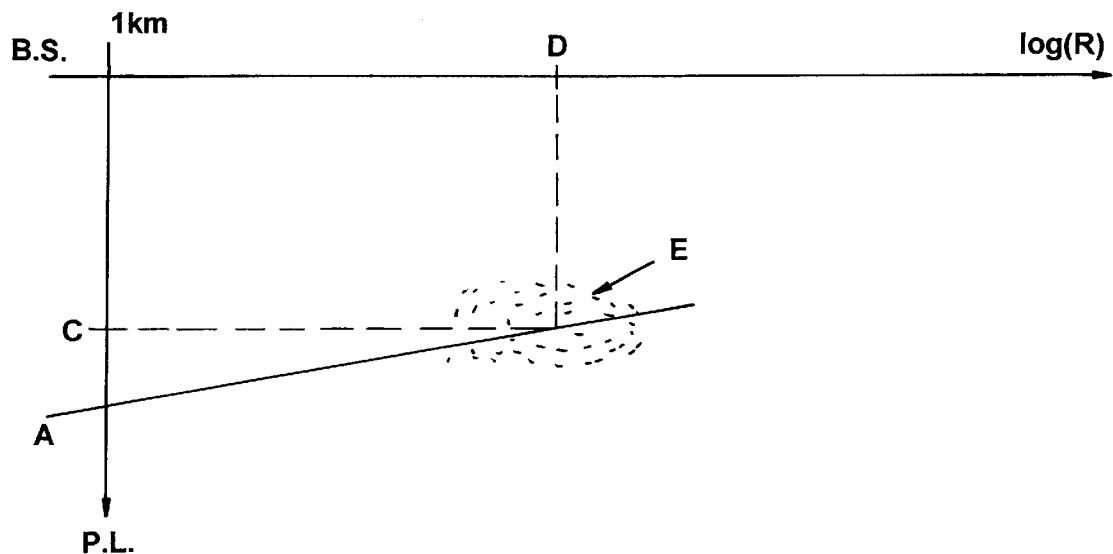
FIGS. 2a and 2b show plots of path loss versus base station distance with prior art and inventive line fitting techniques applied.
Figure 2B:
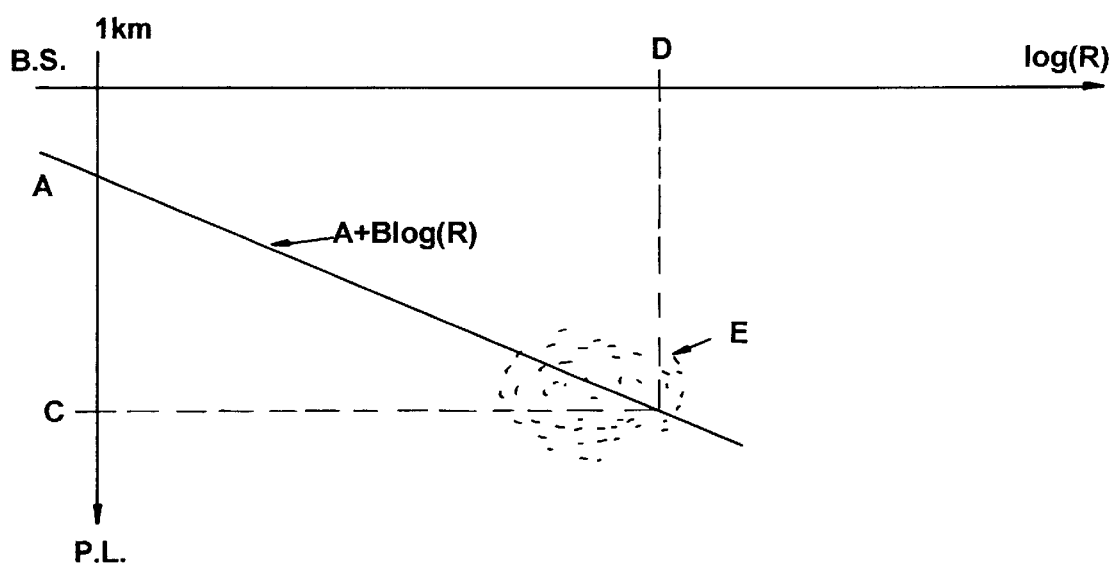

FIGS. 2a and 2b show road test data E from a cell plotted on a graph of path loss (dB) P.L. versus log distance from the base station R (km). Prior art methods using a least squares line fit of this data to determine the cell radius can lead to inaccurate estimates especially where the range of data is limited and biased by localised geomorphological features such as hill shadow for example. The cell radius is estimated by determining a minimum signal level for the cell (e.g. $-90$ $dBm_m$) and reading off the range or distance from the base station indicated by the line fit. As the raw data for cells of the same geomorphological classification and even within a cell can vary significantly as described above, cell radius estimation using these methods can produce conflicting results. These sorts of variations in the raw data of similar cells can result in varying slopes to the least squares line fit which in turn will result in significant variation in cell radius estimates for cells of the same geomorphology. This inaccuracy is commercially important for cell planning and network bidding as errors at the planning stage often have to be rectified at installation with the addition of base stations, or the realisation that too many base stations have been installed. In both cases adversely affecting the cost and profits of the whole network installation enterprise.

In the improved estimation method of the invention, a line of fixed gradient B is fitted to the raw data E as shown in FIG. 2b and as described below to obtain an estimated cell radius D at a predetermined signal level C. The fixed slope also determines a path loss intercept value A at a predetermined distance from the base station which can be related to antenna height and cell geomorphology. The path loss P.L. closer than this is difficult to characterise and model because of the spurious effects of the antenna elevation pattern and reflections at high signal levels close to the base station. However antenna pattern correction techniques can be employed to reduce this distance.

A line fit of P.L.=A+Blog(R) is applied to the broad data E on the graph of path loss versus log base station distance as shown in FIG. 2b. The difference Δ between the measured and predicted path loss for each base station distance measured is $\Delta = P.L._i - A - B R_i$.

By fixing the gradient B of the path loss, the difference Δ is only related to the intercept value A, which is determined by the following equations:

$$A = (\Sigma P.L._i - B \Sigma R_i)/n$$

where n=number of data values

Application of the fixed slope path loss line A+BlogR allows the cell radius estimation D to be read off the base station distance R axis in FIG. 2, at a predetermined signal level C, for example $-90$ $dBm_m$.

Preferably the fixed gradient B used in the path loss is that of the Hata model for path loss. This is a function of base station height, being:

(44.9−6.55 log (base height (m)) )

Alternatively the gradient from other path loss models may be used.

While the application of the model has been detailed graphically, in practice the method will usually be embodied within a computer software package.

To improve the usefulness of the road test data for each cell, test data less than a predetermined distance from the base station is preferably filtered out.

Preferably this predetermined distance is around 1 kilometer for rural and suburban areas. At ranges closer than this, the signal strength is strongly influenced by the antenna elevation pattern and reflections. Beyond about 1 kilometer these influences are much less significant thereby improving the validity of the data. It is however possible to correct for the antenna pattern and reduce this predetermined distance.

Preferably, data with a signal strength below a predetermined level is also filtered out. This predetermined signal floor may be for example the signal floor of the receiving device used to determine the path loss and range data. In practice a slightly higher signal level will be used to incorporate a safety margin. The elimination of such data eliminates the biasing effect such anomalous data would have on the fitting of the fixed slope path loss line A+B log R to the test data.

Preferably data with a range over which the average signal level is within a predetermined signal difference level of a predetermined signal floor level is also filtered out. This is employed to reduce the influence of the signal floor on the test data which tends to compress the log normal fading, and thereby shift up the line-fit and hence detrimentally affect the cell radius estimation. The predetermined signal floor level corresponds to the noise floor of the receiving or signal measuring device used, or a suitable margin above this. Preferably the predetermined signal difference level corresponds to two standard deviations of the average signal level. Therefore, when the noise floor (plus margin) is within two standard deviations of the average signal of a given range, data corresponding to that range and above is filtered out.

Data above a predetermined signal level should also be filtered out to overcome limitations in the receiving device due to front end compression. This will be due to the limited dynamic signal measuring range of the device.

Preferably all data having a path loss less than the theoretical minimum path loss for a given range should also be removed. This theoretical minimum path loss corresponds to the path loss of free space plus a correction factor for ground reflection.

A further data filtering process may be added to remove anomalous peaks or troughs in the data which are out-of-line with the rest of the data, resulting for example from the dominant effects of a significant geomorphological feature such as the signal shadow of large buildings. This process may be done by operator "eye" or a computer algorithm designed for example to eliminate data over a predetermined path loss different from the path loss average at that range. This may be implemented in a number of ways including a neural networks application for example.

As described above, the estimated cell radius corresponds to a 50% reliability cell edge. In practice, the required cell radius estimate is typically the 75% reliability cell edge which corresponds to 95% cell coverage reliability. This is derived from the 50% reliability cell edge in known statistical manner utilising the standard deviation of the test data to derive a signal level which corresponds to 75% of the data at the cell edge being above the predetermined signal level C.

It can be seen from FIGS. 2a and 2b, that the use of the fixed gradient method eliminates the unstable nature of the path loss gradients obtained using prior art best line fit approaches, which in turn results in improved cell radius estimates for limited range test data.

Figure 3:
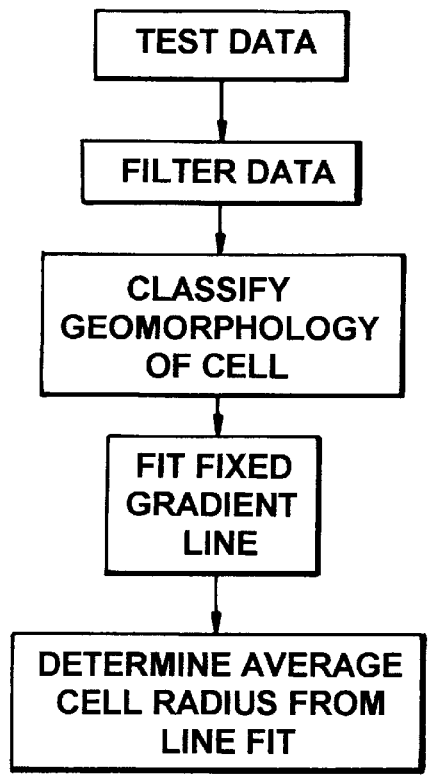
FIG. 3 shows a flowchart of the cell radius estimation method of the invention.

FIG. 3 shows a flow chart of the preferred method of determining cell radius. The test data is either gathered on a road test for example, or may be derived from an existing store or data base of such data. The test data is filtered to remove the spurious and invalid data as described above. The cells geomorphology is identified to classify this data as a particular type, for example suburban hilly. This is used to build up models of path loss for cells of different geomorphology. The classification can be obtained using available geomorphological data on the cell from an existing data base, or from operator entered clutter and topology factors. A fixed gradient line B is fitted to the data according to the equation PL=A+BlogR. Preferably, the fixed gradient is dependent on the base station height and is preferably defined by the Hata model.

The estimated cell radius D is then read off the fixed slope line PL=A+BlogR at a predetermined signal level C. This provides an estimate for the 50% reliability cell edge which can then be used to derive the 75% reliability cell edge in known manner.

Use of the fixed gradient path loss line fit provides a far more stable cell estimation method than prior art methods. The fixed gradient method provides an improved fast and inexpensive method for estimating cell radius for planning and bidding purposes, particularly where the drive test coverage of the cell is limited and biased by geomorphological influences not typical of the rest of the cell. The method therefore provides a fast, low cost, and accurate cell estimation method for network planning and bidding.

The use of the more accurate cell estimation techniques in road tested cells can be applied to the estimation of untested cells. The present invention also provides a method of estimating the cell radius of planned cells based on the results of previously measured cells of the same or similar geomorphology. This method can be used in network planning and bidding to estimate the number of base stations required for a given network coverage area. Prior art methods tend to require extensive road testing of the coverage area. The present invention reduces the level of road testing by applying the test data available to planned cells where no road testing has been carried out.

Figure 4:
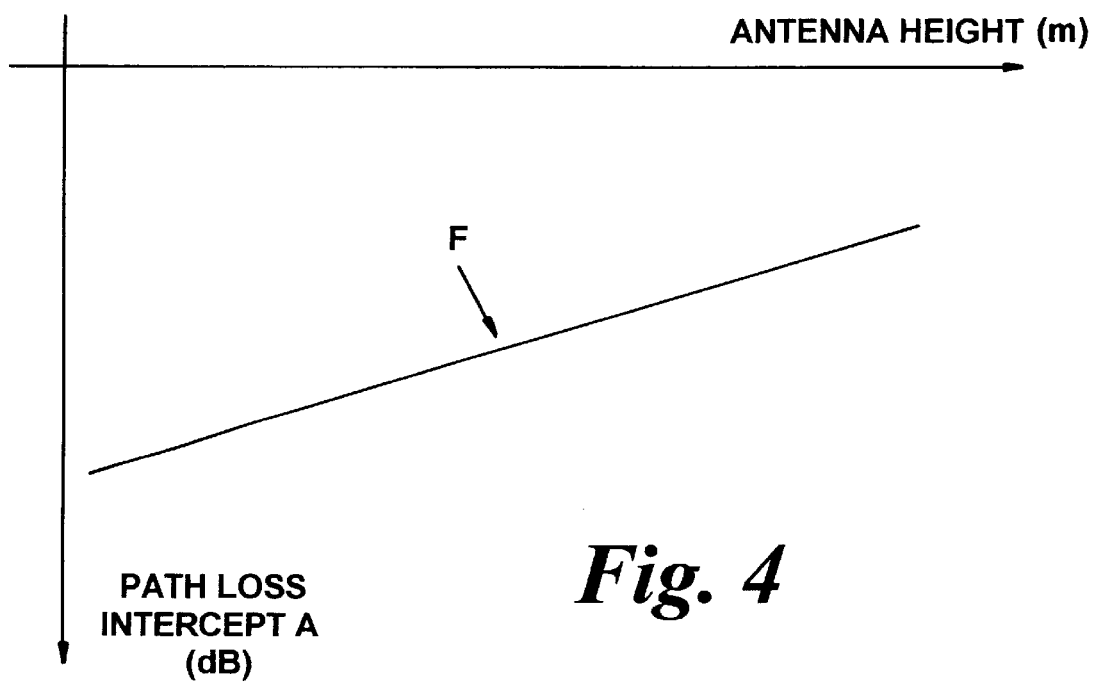
FIG. 4 shows a model of path loss intercept versus base station antenna height.

Referring to FIG. 4, a model of path loss intercept values A for base station antenna heights can be built up for cells of each geomorphology classification using test data from road tested cells. The measured intercepts A are added to a data base of intercepts A versus base station antenna height for each cell geomorphology classification (shown as data set F). A line fit is applied to the data to derive a model of path loss intercept A for different base station heights, for each classification of geomorphology. The line fit may be a fixed gradient type, or a least squares line fit for example. Additional road test data from cells of the same geomorphology classification but from different network areas can also be added to further tune this model which can then be used to obtain for a planned cell of the same classification, a value of intercept A for the planned base station antenna height. This intercept A can then be applied to the model for the signal path loss (A+B log R) to obtain a cell radius estimation D for a given maximum cell signal level C.

In the preferred embodiment method, the path loss gradient B is fixed by the Hata model dependent on the base station antenna height. The intercept value A (the path loss at say 1 kilometer) will vary with different cell road tests which may be biased by different geomorphological features within a cell. The intercepts A from the road test data are collated from a number of installed cells of similar average or overall geomorphology classification. A plot of the intercept points A versus the base station's antenna heights can be constructed as shown in FIG. 4. A line fit is applied to this data F to determine a model for base station height versus path loss intercept level A for cells of the same geomorphology classification.

The cell geomorphology is identified for each cell based on factors such as the urban suburban or industrial environment of the cell, the cells topology, vegetation type, and the density and distribution of man-made objects; its clutter factor. This can be determined from available digitised map data bases which contain clutter factor and other information on a cell's geomorphology and which can be used to determine a particular cell's geomorphological classification. Alternatively, the operator providing the road test data can, in addition to path loss and base station distance data, provide clutter factor and other morphology data at each or selected measurement sites within the cell. The classification of cell geomorphology may be as simple as selecting rural, suburban or urban cells based on average clutter factor figure for the cell. Other more complex classifications could also be used for example building heights and densities.

The intercept point A therefore can be quantified for a particular cell geomorphology and planned cell antenna height. The intercept value A together with the fixed gradient B of the signal path loss line (A+B log R) and the base station EIRP gives the cell radius D of a cell for a particular base station height (and geomorphology classification), given the minimum cell signal level C. Models for cells of different geomorphologies can be constructed in the same way, and the models can be continually tuned with new road test data from other cells of the same geomorphology to improve the model accuracy and to take account of changing conditions for example by applying the cell models to different countries.

The developed path loss intercept A versus base station height models for cells of a given geomorphology can be used together with the fixed gradient B method of cell radius estimation to generate cell estimates for untested cells of that classification within a network. This can be used within network planning for example where a percentage of the planned cells are road tested to estimate cell radius, and to build up a model for each geomorphological classification as described above. The models can then be applied to the remaining planned cells for cell radius estimation to determine whether the planned cell layout will provide adequate coverage. This method significantly reduced the time and cost involved in network planning, while also significantly increasing the initial accuracy of this process.

Figure 5:
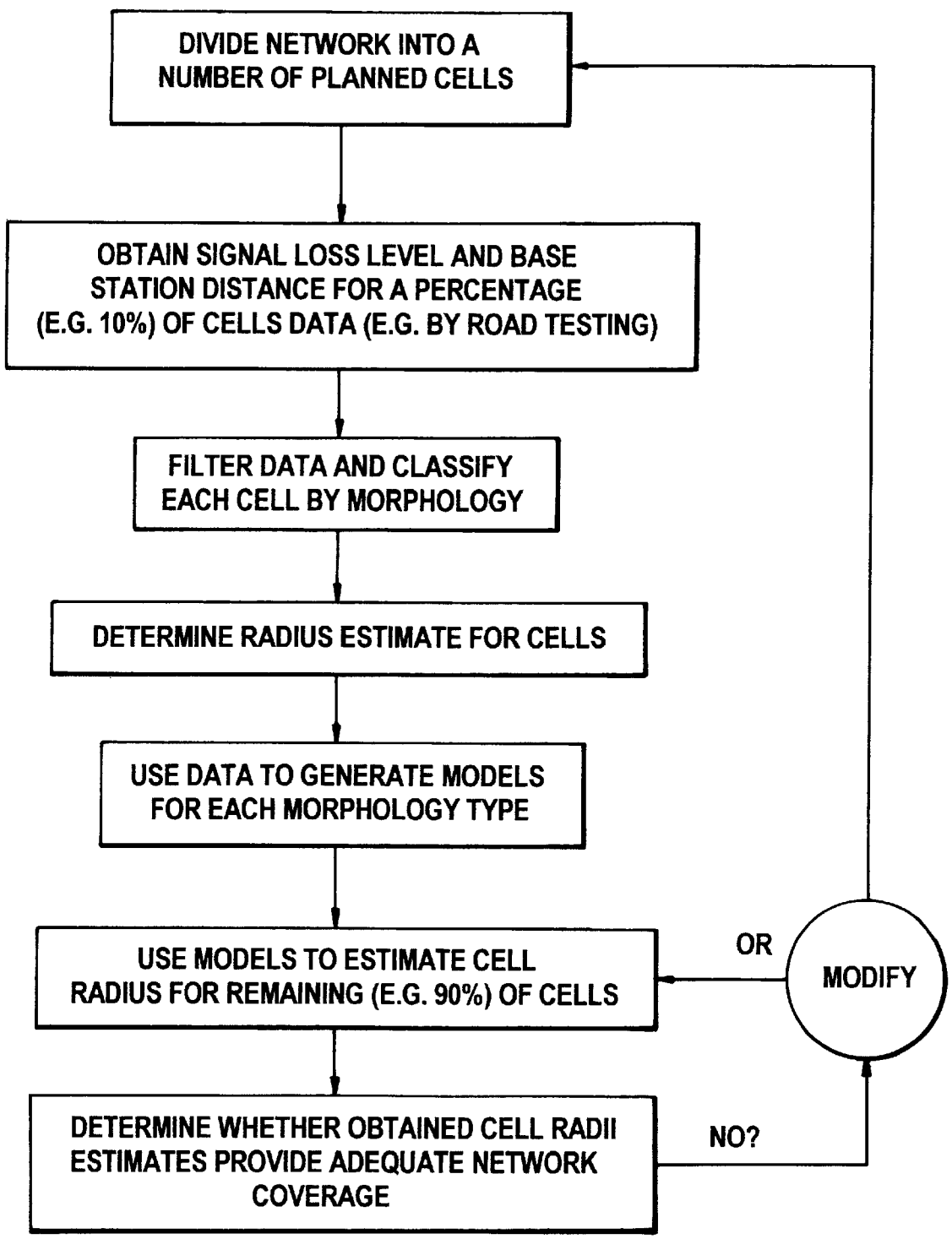
FIG. 5 shows a flowchart of the network planning method of the invention.

FIG. 5 shows a flow chart of a preferred method of network planning. The planned network is initially divided into a number of planned cells, each with a central base station. A percentage of these planned cells are then road tested to obtain signal level and location data which is then converted into path loss and distance from base station data. Preferably approximately 10% of the planned cells are actually road tested. The test data is filtered and classified according to its geomorphology as previously described. The radius of these cells is then estimated using the fixed gradient method of the invention. The data is also used to generate and tune path loss intercept A versus antenna height models for each geomorphological classification of cell. These models can then be used to estimate the cell radius for each of the remaining non road-tested cells (90%). By combining the estimated cell radii of the proposed base stations in the network coverage area, it can be determined in known manner whether the proposed base station layout provides adequate network coverage. If this is not the case, the number and/or positioning of the planned cells can be modified and if necessary further road testing and/or cell estimation from existing data can be employed.

While the preferred embodiment invention has been described in relation to obtaining cell radius estimates for omni-directional base stations, it would be understood by the skilled person that with appropriate modification, the method could be applied to the estimation of sectorised cell coverage.

While the preferred embodiment has been described with reference to use of a single fixed gradient line fit for the path loss and range data, a line fit comprising two or more fixed gradient sections in which the gradients are different could also be applied to the data. In this alternative, path loss data corresponding to a section of the range data is fitted with a first fixed gradient line, and path loss data outside the section is fitted with a line of a second fixed gradient.

In addition to the foregoing, the method can be modified to incorporate an error or variance factor into the derived cell radius estimate to achieve an optimistic and a pessimistic cell radius, and in the case of network planning to obtain optimistic and pessimistic estimates for the number of base stations required for network coverage.

The above described cell radius estimation method can be applied both to networks of cells for example mobile or fixed wireless access systems, or to individual cells which may be remote from any similar cells.

The foregoing describes the invention including a preferred form thereof. Alternations and modifications as would be obvious to some one skilled in the art are intended to be incorporated within the scope hereof.

What is claimed is:

1. A method for estimating the radius of a radio telecommunications cell comprising the steps of:

determine path loss and range data from a plurality of predetermined locations within said cell;

apply a predetermined gradient line fit to said data;

obtain from said line fit a radius estimate for said cell corresponding to a predetermined signal level.

2. A method as claimed in claim 1 wherein the predetermined gradient line fit is determined according to the equation:

$$A = (\Sigma S.L._i - B\Sigma R_i)/n.$$

3. A method as claimed in claim 2 wherein the predetermined gradient is dependent on the height of the base station antenna.

4. A method as claimed in claim 3 wherein the predetermined gradient is determined from the Hata path loss model.

5. A method as claimed in claim 1 comprising the additional step of:

removing determined data less than a predetermined range.

6. A method as claimed in claim 1 comprising the additional step of:

removing determined data having a signal level below a predetermined signal floor level.

7. A method as claimed in claim 1 comprising the additional step of:

removing determined data with a range over which the average signal level is within a predetermined signal difference level of a predetermined signal floor level.

8. A method as claimed in claim 7, wherein the predetermined signal difference level corresponds to two standard deviations of the average signal level at said range.

9. A method as claimed in claim 1 comprising the additional step of:

removing determined data having a path loss less than a theoretical minimum path loss.

10. A method as claimed in claim 1 comprising the additional step of:

removing determined data having a signal level above a predetermined maximum signal level.

11. A method as claimed in claim 1 comprising the additional step of:

removing determined data having a path loss differing from other determined data at substantially the same range by an amount greater than a predetermined path loss difference.

12. A method of determining models for radio telecommunications cell radius estimation comprising the steps of:

determine path loss and range data from a plurality of predetermined locations within each of a plurality of cells;

classify each cell according to geomorphology;

for each cell apply a predetermined gradient line fit to said data and determine a path loss intercept at a predetermined range;

for each classification add said intercept values for each cell together with a corresponding base station height to a database, apply a line fit to said database data to obtain a model of path loss intercept values versus base station antenna height for use in the estimation of cell radii for cells of a selected base station height and geomorphology classification.

13. A method for estimating the radius of a radio communications cell comprising the steps of:

determine the path loss intercept value for a selected base station height and geomorphology from a model determined by:

a method of determining models for radio telecommunications cell radius estimation comprising the steps of:

determine path loss and range data from a plurality of predetermined locations within each of a plurality of cells;

classify each cell according to geomorphology;

for each cell apply a predetermined gradient line fit to said data and determine a path loss intercept at a predetermined range;

for each classification add said intercept values for each cell together with a corresponding base station height to a database, apply a line fit to said database data to obtain a model of path loss intercept values versus base station antenna height for use in the estimation of cell radii for cells of a selected base station height and geomorphology classification;

apply a predetermined gradient line fit to the intercept; and obtain from said line fit a radius estimate for said cell corresponding to a predetermined signal level.

14. A method of determining radio telecommunications cell radius estimates for planning a cellular network coverage area comprising the steps of:

divide the network coverage area into a plurality of cells;

for a predetermined percentage of said cells determine cell radius estimates according to:

a method for estimating the radius of a radio telecommunications cell comprising the steps of:

determine path loss and range data from a plurality of predetermined locations within said cell;

apply a predetermined gradient line fit to said data;

obtain from said line fit a radius estimate for said cell corresponding to a predetermined signal level;

and, for the remaining percentage of cells determine cell radius estimates according to:

a method for estimating the radius of a radio communications cell comprising the steps of:

determine the path loss intercept value for a selected base station height and geomorphology from a model determined by:

a method of determining models for radio telecommunications cell radius estimation comprising the steps of:

determine path loss and range data from a plurality of predetermined locations within each of a plurality of cells;

classify each cell according to geomorphology;

for each cell apply a predetermined gradient line fit to said data and determine a path loss intercept at a predetermined range;

for each classification add said intercept values for each cell together with a corresponding base station height to a database, apply a line fit to said database data to obtain a model of path loss intercept values versus base station antenna height for use in the estimation of cell radii for cells of a selected base station height and geomorphology classification;

apply a predetermined gradient line fit to the intercept; and obtain from said line fit a radius estimate for said cell corresponding to a predetermined signal level.

* * * * *